United States Patent
Hatatani et al.

(10) Patent No.: US 8,149,548 B2
(45) Date of Patent: Apr. 3, 2012

(54) MAGNETIC HEAD AND MANUFACTURING METHOD THEREOF

(75) Inventors: Masahiko Hatatani, Kanagawa (JP); Katsuro Watanabe, Ibaraki-Ken (JP); Nubuo Yoshida, Kanagawa (JP); Katsumi Hoshino, Kanagawa (JP)

(73) Assignee: Hitachi Global Storage Technologies Netherlands BV, Amsterdam (NL)

(*) Notice: Subject to any disclaimer, the term of this patent is extended or adjusted under 35 U.S.C. 154(b) by 446 days.

(21) Appl. No.: 12/386,458

(22) Filed: Apr. 17, 2009

(65) Prior Publication Data

US 2009/0262465 A1  Oct. 22, 2009

(30) Foreign Application Priority Data

Apr. 18, 2008  (JP) ................ 2008-108925

(51) Int. Cl.
G11B 5/39  (2006.01)
(52) U.S. Cl. .............................. 360/324.12
(58) Field of Classification Search .............. None
See application file for complete search history.

(56) References Cited

U.S. PATENT DOCUMENTS

| | | | |
|---|---|---|---|
| 5,018,037 A | 5/1991 | Krounbi et al. | |
| 6,023,395 A | 2/2000 | Dill et al. | |
| 2008/0182133 A1* | 7/2008 | Shiimoto et al. | 428/811.2 |
| 2009/0034135 A1* | 2/2009 | Hoshiya et al. | 360/324.12 |
| 2011/0181987 A1* | 7/2011 | Shiimoto et al. | 360/316 |
| 2011/0215800 A1* | 9/2011 | Zhou et al. | 324/252 |

FOREIGN PATENT DOCUMENTS

JP  11-259824  9/1999

* cited by examiner

Primary Examiner — Kevin Bernatz
(74) Attorney, Agent, or Firm — Daphne L. Burton; Burton IP Law Group

(57) ABSTRACT

Embodiments of the present invention provide a magnetic head having a read head of stable reading operation and with less magnetic fluctuation noise. According to one embodiment, a free layer has a structure comprising two ferromagnetic layers (a first free layer and a second free layer) that are coupled anti-ferromagnetically by way of a non-magnetic intermediate layer, in which the magnetization amount of the first free layer is set to larger than the magnetization amount of the second free layer. Further, the magnetic domains in the first free layer and the second free layer are stabilized simultaneously by increasing the distance between the second free layer and the magnetic domain control film to be more than the distance between the first free layer and the magnetic domain control film, thereby adjusting the magnetization amount of the magnetic domain control film. Further, the volume of the entire free layer is increased thereby greatly decreasing the magnetic fluctuation noises, to obtain a read head showing a high SN ratio.

16 Claims, 9 Drawing Sheets

US 8,149,548 B2

MAGNETIC HEAD AND MANUFACTURING METHOD THEREOF

CROSS-REFERENCE TO RELATED APPLICATION

The instant nonprovisional patent application claims priority to Japanese Patent Application No. 2008-108925 filed Apr. 18, 2008, and which is incorporated by reference in its entirety herein for all purposes.

BACKGROUND OF THE INVENTION

Generally a magnetic read head includes a pair of upper and lower magnetic shield layers, a magnetoresistive film disposed therebetween, and a pair of electrodes connected electrically to the magnetoresistive film. In the case of magnetic recording and reproducing apparatus having an areal recording density in excess of 300 Gbits per 1 square inch, a high sensitive read device such as a tunneling magnetoresistive film (TMR film) or a current-perpendicular-to-plane giant magnetoresistive film (CPP-GMR) is utilized as a magnetoresistive film. The magnetoresistive film has a free layer, an intermediate layer, and a pinned layer, in which the magnetization in the free layer rotates in accordance with the change of signal magnetic fields from a recording medium. On the other hand, the direction of the magnetic moment in the pinned layer is generally fixed. When a sense current is supplied to the magnetoresistive film, a voltage between electrodes of the device changes depending on the angle formed between the magnetic moment of the free layer and the magnetic moment of the pinned layer. The resulting voltage is detected as a read signal. In the CPP-GMR film, the intermediate layer is a conductor and an oxide or the like is used in the TMR film.

In the magnetic read head, a magnetic domain control film is disposed on both ends in the direction of the track width of the free layer for making the free layer into a single magnetic domain structure or preventing magnetic domain movement. This configuration aims at preventing erroneous operation of the recording and reproducing apparatus caused by output fluctuation or the like due to movement of the magnetic domain in the case where the magnetic domain of the free layer undergoes a magnetic effect from the write element, upper and lower magnetic shields, etc. For such a magnetic domain control film, a permanent magnet is generally used (see Japanese Patent Publication No. 3-125311 "Patent Document 1"). On the other hand, In the case of the TMR film or the CPP-GMR film, it has also been proposed to adopt a structure in which a magnetic domain control film is stacked to a ferromagnetic free layer. In this case, as the magnetic domain control film, a permanent magnet (see Japanese Patent Publication No. 11-259824 "Patent Document 2") or a stacked layer of an anti-ferromagnetic layer and a ferromagnetic layer (see U.S. Pat. No. 6,023,395 "Patent Document 3") has been known.

To increase the density of the magnetic recording and reproducing apparatus, it is useful to narrow a recording bit and, for coping therewith, it is requested to narrow the distance between upper and lower magnetic shields of the magnetic read head and the read track width thereof.

As described above, to improve the recording density of the magnetic recording and reproducing apparatus, the read track width of the magnetic read head has been finely formed. Generally, the read track width is narrower, the read output is lowered. Further, it has been pointed out that magnetization fluctuation noises become actual as the read device is made finer. The magnetization fluctuation noise is caused by thermal fluctuation of magnetization in the free layer. Generally, as the volume of a magnetic body decreases, thermal fluctuation of magnetization increases. Accordingly, as the device is made finer, the volume of the free layer is decreased to increase the thermal fluctuation of magnetization in the free layer. Then, a relative angle between the magnetization in the free layer and the magnetization in the pinned layer fluctuates greatly, resulting in increased noise. Further, it has a characteristic that the magnetization fluctuation noise increases in proportion to the output. This means that unless the magnetization fluctuation noise per se is suppressed, improvement for a signal-to-noise ratio cannot be expected even when the output is merely increased.

BRIEF SUMMARY OF THE INVENTION

Embodiments of the present invention provide a magnetic head having a read head of stable reading operation and with less magnetic fluctuation noise. According to the embodiment of FIG. 1, a free layer has a structure comprising two ferromagnetic layers (free layer 1, free layer 2) that are coupled anti-ferromagnetically by way of a non-magnetic intermediate layer 19, in which the magnetization amount of the free layer 1 (18) is set to larger than the magnetization amount of the free layer 2 (20). Further, the magnetic domains in the free layer 1 (18) and the free layer 2 (20) are stabilized simultaneously by increasing the distance Sp2 between the free layer 2 (20) and the magnetic domain control film 41 more than the distance Sp1 between the free layer 1 (18) and the magnetic domain control film 41, thereby adjusting the magnetization amount of the magnetic domain control film 41. Further, the volume of the entire free layer is increased thereby greatly decreasing the magnetic fluctuation noises, to obtain a read head 100 showing a high SN ratio.

DETAILED DESCRIPTION OF THE INVENTION

Figure 1:
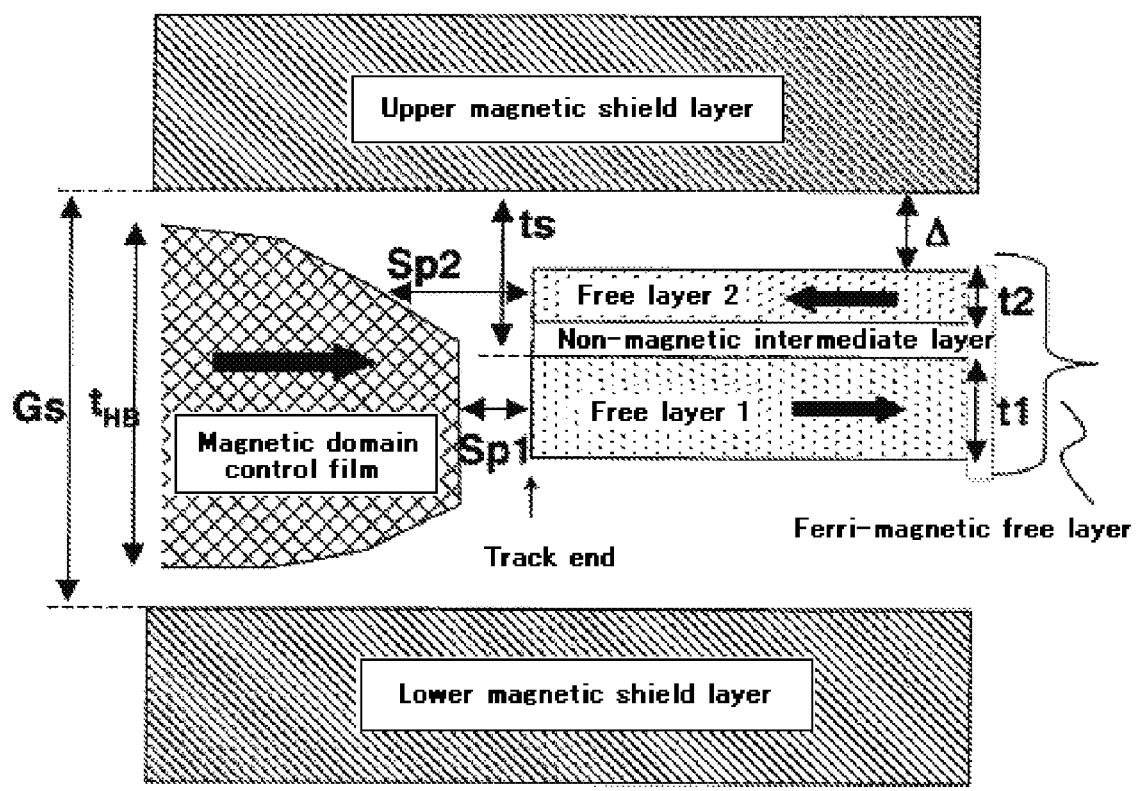
FIG. 1 is an enlarged conceptional view of a read head according to an embodiment of the invention at the medium opposing surface.

Embodiments of the present invention relate to a magnetic head used for magnetic recording and reproducing apparatus and a manufacturing method thereof, and particularly relate to a constitution and a manufacturing method of a magnetic read head.

As a structure used to effectively decrease the magnetic fluctuation noise, a ferri-magnetic free layer has been proposed. In the ferri-magnetic free layer, two ferromagnetic layers (free layer 1 and free layer 2) are stacked by way of a non-magnetic metal to maintain magnetization of them anti-parallel with each other. Accordingly, effective magnetization is determined by the difference between the magnetization amount in the free layer 1 and the magnetization amount in the free layer 2. The ferri-magnetic free layer has a feature capable of decreasing the effective magnetization while keeping the entire volume of the free layer. As described above, by increasing the entire volume of the free layer and decreasing the effective magnetization, a high read sensitivity can be maintained and the magnetization fluctuation noise can be suppressed.

In the ferri-magnetic free layer, a magnetization direction in a layer of larger magnetization amount (free layer 1) and a magnetization direction in a magnetic domain control film are generally aligned. Accordingly, the magnetization direction in the free layer 2 is anti-parallel with respect to the magnetization direction in the magnetic domain control film. Further, since anti-ferromagnetic coupling between the free layer 1 and the free layer 2 is infinite, when the magnetic domain control field is large, a region where the magnetization in the free layer 1 and the magnetization in the free layer 2 cannot be maintained in anti-parallel with each other is generated. If such a region is present, the operation of the magnetization in the free layer 2 becomes instable upon application of a medium signal magnetic field to cause increase of the noise and fluctuation of the read output. On the other hand, if the magnetic domain control field is weak, the operation of the free layer 1 becomes instable. That is, it is difficult in the current magnetic domain control structure to stably control the free layer 1 and the free layer 2 of the ferri-magnetic free layer simultaneously.

As described above, even when a ferri-magnetic free layer capable of effectively suppressing the magnetic fluctuation noise is used, the increase of the noise and instability of the head operation may occur in the current magnetic domain control structure. If such a magnetic head were assembled into a magnetic recording and reproducing apparatus, it is apparent that the apparatus would not operate normally.

An object of embodiments of the present invention is to provide a magnetic head with less magnetic fluctuation noise during reading and with stable operation.

Another object of embodiments of the invention is to provide a method of manufacturing a magnetic head with less magnetization fluctuation noise during reading and with stable operation.

To attain the purpose described above, the magnetic head of embodiments of the invention comprises: a lower magnetic shield layer; an upper magnetic shield layer; a magnetoresistive film disposed between the lower magnetic shield layer and the upper magnetic shield layer and having a pinned layer, an intermediate layer and a free layer; and a magnetic domain control film disposed on both ends in the direction of the track width of the magnetoresistive film. The free layer has a free layer 1 and a free layer 2 stacked by way of a non-magnetic intermediate layer. The free layer 1 is stacked by way of the intermediate layer to the pinned layer. Magnetization in the free layer 1 and magnetization of the free layer 2 are in anti-parallel with each other. The magnetization amount in the free layer 1 is larger than the magnetization amount in the free layer 2. Further, Sp2>Sp1 is satisfied assuming a distance between the free layer 1 and the magnetic domain control film as Sp1 and a distance Sp2 between the free layer 2 and the magnetic domain control film as Sp2. 2× The relationship between the Sp1 and the Sp2 may be Sp2>Sp1. In one embodiment, Sp1 is a distance between the center of the free layer 1 in the direction of its thickness and the magnetic domain control film, and Sp2 is a distance between the center of the free layer 2 in the direction of its thickness and the magnetic domain control film.

A lower electrode layer may be present above the lower magnetic shield layer, and an upper electrode layer may be present below the upper magnetic shield layer. Each of the free layer 1 and the free layer 2 may comprise two or more ferromagnetic layers by way of a non-magnetic metal layer and magnetizations in each of the ferromagnetic layers are in parallel with each other.

The non-magnetic intermediate layer may be at least one element selected from the group consisting of Ta, Cu, Ru, Cr, Ir, and Rh.

A read/write head can be constituted by providing a read head adjacent to the upper magnetic shield layer.

To attain the object described above, a magnetic head according to embodiments of the invention may comprise: a lower magnetic shield layer; an upper magnetic shield layer; a magnetoresistive film disposed between the lower magnetic shield layer and the upper magnetic shield layer and having a pinned layer, an intermediate layer, and a free layer; and a magnetic domain control film disposed on both ends in the direction of the track width of the magnetoresistive film. The free layer has a free layer 1 and a free layer 2 stacked by way of a non-magnetic intermediate layer. The free layer 1 is stacked by way of the intermediate layer to the pinned layer. Magnetization in the free layer 1 and magnetization in the free layer 2 are in anti-parallel with each other. The product of a saturation magnetic flux density of the free layer 1 and a thickness of the free layer 1 $(Bs \cdot t)_1$ is larger than the product of a saturation magnetic flux density of the free layer 2 and a thickness of the free layer 2 $(Bs \cdot t)_2$. Further, $(Br \cdot t)_{PM} \geq (9 \times Sp1/ts) \times \{(Bs \cdot t)_1 - (Bs \cdot t)_2\}$ and $H_{AF2} > H_{bias2}$ are satisfied when assuming a distance between the free layer 1 and the magnetic domain control film as Sp1, a distance between the free layer 2 and the magnetic domain control film as Sp2, a distance between the free layer 1 and the upper magnetic shield as ts, the product of the residual magnetic flux density and the film thickness of the magnetic domain control film as $(Br \cdot t)_{PM}$, an anti-ferromagnetic coupling field applied to the free layer 2 as $H_{AF2}$, and the magnetic domain control field applied to the free layer 2 as $H_{bias2}$.

The relation $H_{AF2} > H_{bias2}$ is attained by defining the relation between the Sp1 and the Sp2 as Sp2>Sp1.

To attain another object of embodiments of the invention, a method of manufacturing a magnetic head of one embodiment of the invention includes the steps of: forming a lower magnetic shield layer; stacking a pinned layer, an intermediate layer, a free layer 1, a non-magnetic intermediate layer, and a free layer 2 above the lower magnetic shield layer thereby forming a magnetoresistive film, in which magnetization in the free layer 1 and magnetization in the free layer 2 are in anti-parallel with each other, and the magnetization amount in the free layer 1 is larger than the magnetization amount in the free layer 2; forming a magnetic domain control film on both ends in the direction of the track width of the magnetoresistive film, in which Sp2>Sp1 is satisfied when assuming a distance between the center of the free layer 1 in the direction of its thickness and the magnetic domain control film as Sp1 and a distance between the center of the free layer 2 in the direction of its thickness and the magnetic domain control film as Sp2; and forming an upper magnetic shield layer above the magnetoresistive film and the magnetic domain control film.

The step of forming the magnetic domain control film includes a step of controlling the incident direction of sputtered magnetic particles so as to satisfy Sp2>Sp1.

The step of forming the magnetic domain control film includes a step of forming a hard magnetic film and a step of patterning the hard magnetic film so as to satisfy the Sp2>Sp1 by ion milling.

According to embodiments of the invention, since the magnetic domain control field applied to the free layer 2 can be decreased while sufficiently ensuring the magnetic domain control field applied to the free layer 1 in the laminated ferri-magnetic free layer, it is possible to provide a magnetic head capable of magnetic domain control for the free layer 1 and the free layer 2 simultaneously and sufficiently, suppressed sufficiently for the magnetization fluctuation noise and having stable operation.

First, the magnetic head according to one embodiment of the invention is described with reference to FIG. 1. FIG. 1 is a conceptual view of a read head as viewed at the opposing surface of a medium. In FIG. 1, only the upper and lower magnetic shield layers, a magnetic domain control film and a ferri-magnetic free layer are shown. Further, for the sake of simplicity of description, only one of the pair of magnetic domain control films is illustrated. A non-magnetic intermediate layer is disposed between a free layer 1 and a free layer 2, and magnetization in the free layer 1 and the magnetization in the free layer 2 are strongly coupled anti-ferromagnetically. They are stacked to each other so as to attain $(Bs \cdot t)_1 > (Bs \cdot t)_2$ assuming the magnetization amount (product of saturation magnetic flux density and film thickness) of the free layer 1 and the free layer 2 as $(Bs \cdot t)_1$ and $(Bs \cdot t)_2$, respectively. For keeping the magnetization in the free layer 1 and the magnetization in the free layer 2 substantially in anti-parallel with each other, the difference between the magnetization amounts $(Bs \cdot t)_1 - (Bs \cdot t)_2$ may be 1T nm or more. In this case, the directions for the magnetization of the magnetic domain control film and the magnetization in the free layer 1 are substantially aligned. On the other hand, the magnetization of the magnetic domain control film and the direction of the magnetization in the free layer 2 are in the direction contrary to each other.

In the case where the magnetic domain control field applied to the free layer 2 exceeds the anti-ferromagnetic coupling field between the free layer 1 and the free layer 2, the magnetization in the free layer 2 is in a direction identical with that of the magnetic domain control field. In such a case, the ferri-magnetic free layer structure is no more attained and the read sensitivity is also lowered extremely. Accordingly, it is necessary that the magnetic domain control field is less than the anti-ferromagnetic coupling field applied to the free layer 2.

Assuming the distance between the center of the free layer 1 in the direction of the film thickness and the magnetic domain control film as Sp1 and the distance between the center of the free layer 2 in the direction of the film thickness and the magnetic domain control film as Sp2, a case where Sp1=Sp2 is considered first. In this case, the magnetic domain control field applied to the free layer 1 and the magnetic domain control field applied to the free layer 2 are substantially equal with each other. Then, the magnetization in the free layer 1 and the magnetic domain control field are in the identical direction, and if the magnetic domain control field is ensured sufficiently, the magnetic domain of the free layer 1 is made stable or formed as a single magnetic domain. On the other hand, magnetization in the free layer 2 is in a direction opposite to that of the magnetic domain control field and the net magnetic field applied to the free layer 2 is a difference formed by subtracting the magnetic domain control field from the anti-ferromagnetic coupling field. Accordingly, when the magnetic domain control field is strong, the net magnetic field applied to the free layer 2 is decreased and the magnetic domain in the free layer 2 is no more stabilized. After all, at Sp1=Sp2, it is difficult to simultaneously stabilize the magnetic domains in the free layer 1 and the free layer 2.

Then, the magnetic domain control film is formed so as to attain Sp2>Sp1. When the Sp1 is narrowed, the magnetic domain control field applied to the free layer 1 can be increased. At the same time, when Sp2 is made wider, control can be conducted so as to decrease the magnetic domain control field applied to the free layer 2.

Specifically, assuming the distance between the free layer 1 and the upper magnetic shield as ts and the amount of magnetization of the magnetic domain control film (product of residual magnetic flux, density and film thickness) as $(Br \cdot t)_{PM}$, and Sp1 and $(Br \cdot t)_{PM}$ are controlled so as to satisfy $(Br \cdot t)_{PM} \geq (9 \times Sp1/ts) \times \{(Bs \cdot t)_1 - (Bs \cdot t)_2\}$, the magnetic domain in the free layer 1 is stabilized. On the other hand, assuming the anti-ferromagnetic coupling field applied to the free layer 2 as $H_{AF2}$ and the magnetic domain control field applied to the free layer 2 as $H_{bias2}$, magnetic domain in the free layer 2 is stabilized by controlling Sp2 so as to satisfy $H_{AF2} > H_{bias2}$. Then, the foregoings are to be explained quantitatively with reference to the result of simulation.

Figure 2:
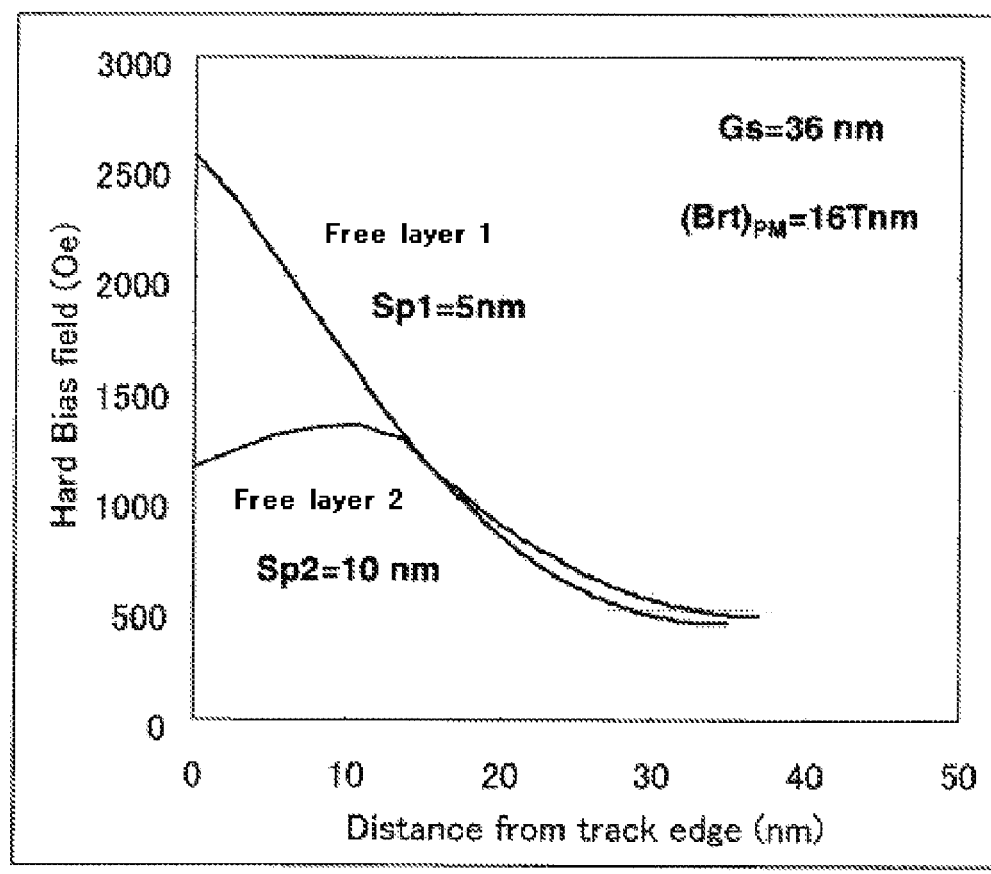
FIG. 2 is a view showing the distribution of a magnetic domain control magnetic field in a free layer of a read head according to an embodiment of the invention.

FIG. 2 shows the result of calculation for the distribution of the magnetic domain control field $H_{bias2}$ (hard bias field) in each of the free layers. The zero point on the abscissa of a graph shown in FIG. 2 represents the track end of the free layer. In FIG. 2, it is set as Gs=36 nm, Sp1=5 nm, Sp2=10 nm, $(Br \cdot t)_{PM}$=16T nm, $(Bs \cdot t)_1$=5T nm, $(Bs \cdot t)_2$=2T nm, and ts=5 nm. In this case, Gs is a distance between the upper magnetic shield layer and the lower magnetic shield layer. In view of FIG. 2, it can be seen that $H_{bias}$ reaches the maximum at the track end and decays as it approaches to the track center in the free layer 1. On the other hand, in the free layer 2, $H_{bias}$ reaches the maximum of a position somewhat inside from the track end and decays as it further approaches the track center.

Then, with use to the result of FIG. 2, micromagnetics simulation was performed by using an LLG (Landau-Lifshits-Gilbert) equation. In the simulation, it was set as $H_{AF2}$=1500 Oe (120 kA/m). As a result, it has been found that the magnetization in the free layer 1 and the free layer 2 operates stably. Further, identical micromagnetics simulation was performed with Sp2 being less than 10 nm, but it has been found that magnetization in the free layer 2 did not operate stably. Accordingly, since $H_{AF2}$=1500 Oe (120 kA/m) and the maximum value of $H_{bias2}$ is 1370 Oe (110 kA/m), it can be seen that the relation $H_{AF2} > H_{bias2}$ is satisfied. Further, an optimal value of $(Br \cdot t)_{PM}$ was investigated by calculating a transfer curve (electromagnetic response curve). Generally, $(Br \cdot t)_{PM}$ necessary for stabilizing the magnetic domain in the free layer is represented by $(Br \cdot t)_{PM} \geq F \times \{(Bs \cdot t)_1 - (Bs \cdot t)_2\}$, and $F \geq 1$. F is a shape factor depending on the position for the magnetic domain control and the head structure. F=1 in the case where Gs or ts is sufficiently large, Sp1=0 nm, and the non-magnetic intermediate layer is sufficiently small. In this case, magnetic charges induced to the end of the free layer in the direction of the track are completely offset by the magnetic domain control field. However, in an actual head, the free layer and the magnetic domain control film are separated by a finite distance. Further, when Gs or ts is narrowed, the magnetic domain control field is absorbed in the shield.

Figure 3:
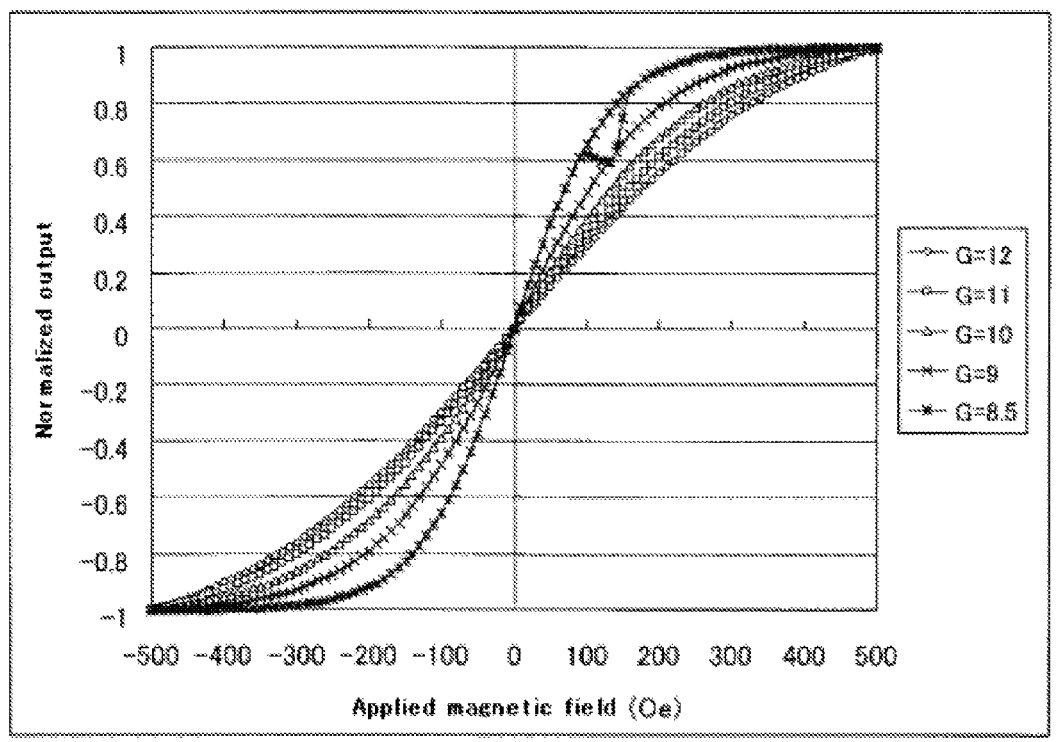
FIG. 3 is a view showing an electromagnetic response curve of a read head according to an embodiment of the invention.

Accordingly, it is necessary to increase $(Br·t)_{PM}$ (F>1). Since the magnetic domain control field increases as Sp1 is decreased and decreases as ts is narrowed, $(Br·t)_{PM}$ necessary for stabilizing the magnetic domain of the free layer can be represented as $(Br·t)_{PM}>(G \times Sp1/ts)\{(Bs·t)_1-(Bs·t)_2\}$. The coefficient G has a relation with F as G=F/(Sp1/ts). FIG. 3 shows a transfer curve relative to the value for each G. As can be seen from FIG. 3, hysteresis occurs in the transfer curve at G<9. Such hysteresis causes output fluctuation or instability of the operation of the apparatus. On the other hand, at G≧9, no abnormality is found in the transfer curve. From the result described above, it can be seen that the operation of the magnetization in the free layer 1 and the free layer 2 are stabilized simultaneously when they satisfy relations $(Br·t)_{PM} \geq (9 \times Sp1/ts) \times \{(Bs·t)_1-(Bs·t)_2\}$ and Sp2>2×Sp1.

As described above, stable operation was confirmed in the ferri-magnetic free layer structure. In the ferri-magnetic free layer, the entire volume or the entire amount of magnetization can be increased while maintaining the difference of the magnetization constant between the free layer 1 and the free layer 2 constantly. In this case, the theoretical equation for the magnetic fluctuation noise is given by the following equation:

$$V_{mag} = \frac{I_s \Delta R}{H_{stiff}} \sqrt{\frac{\alpha k_B T}{\mu_0 M_s V \gamma}}$$

Here, Vmag is the magnetic fluctuation noise voltage, $I_s$ is a sensing current, $\Delta R$ is an amount of change of resistance, Hsiff is stiffness magnetic field, $\alpha$ is decay constant, $k_B$ is Boltzmann constant, T is temperature, $\mu_0$ is magnetic permeability in vacuum, Ms is saturation magnetization, V is volume, and $\gamma$ is magnetization rotation ratio. As can be seen from the equation described above, the magnetization fluctuation noise voltage is in inverse proportion to the square root of the volume of the magnetic body. In this case, the entire magnetization amount in the free layer of the read head according to the invention is set to 2 to 3 times as large as the amount of the existent head. It can be seen that the magnetization fluctuation noise can be decreased, in the read head of the invention, to 0.58 to 0.7 times compared with that of the existent head. On the other hand, in the ferri-magnetic free layer, since the utilization factor of the head can be maintained high even when the entire magnetization amount is increased, lowering of the output as seen in the existent head does not occur. Even when a magnetoresistive film showing the magnetoresistive ratio identical with that of an existent head is used, the signal-to-noise ratio of the read head according to embodiments of the invention is estimated to be higher by 3 to 5 dB. Particular embodiments of the invention are described below.

Embodiment 1

In Embodiment 1, a magnetic domain control film and a magnetoresistive film are formed so as to satisfy $(Br·t)_{PM} \geq (9 \times Sp1/ts) \times \{(Bs·t)_1-(Bs·t)_2\}$ and Sp2>2×Sp1. As the magnetoresistive film, a current-perpendicular-to-plane TMR film was adopted. A permanent magnet was disposed as the magnetic domain control film to both ends in the direction of the track width of the magnetoresistive film.

Figure 4:
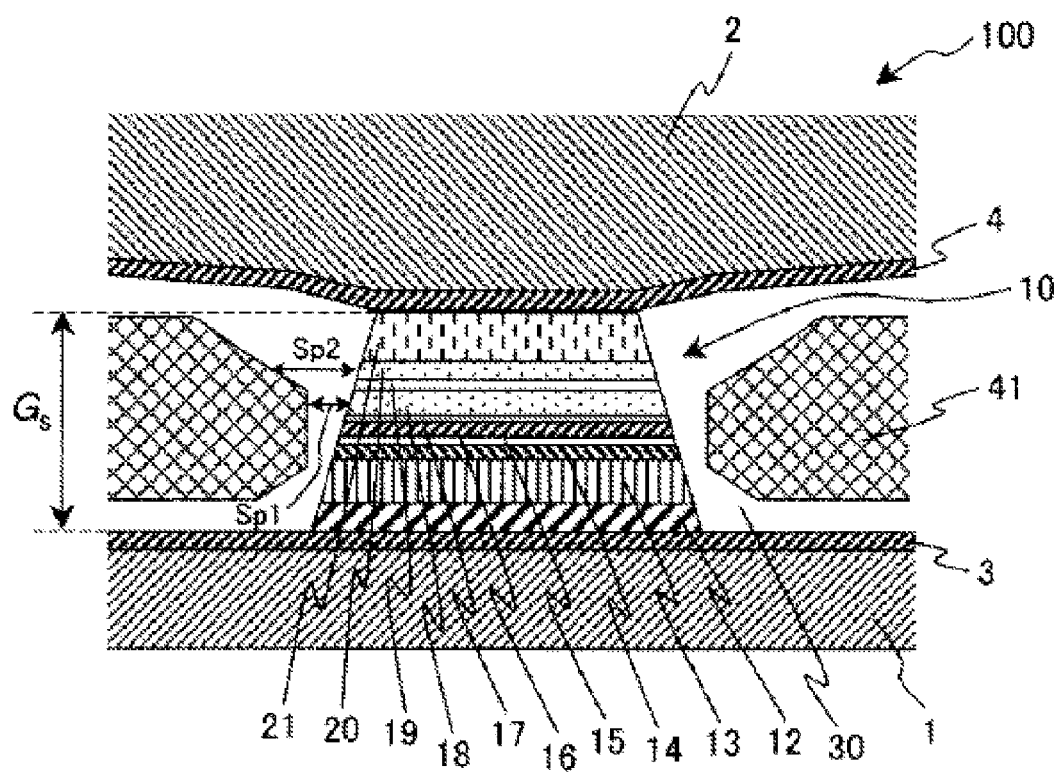
FIG. 4 is an enlarged view of a read head according to Embodiment 1 at the medium opposing surface.

FIG. 4 is an enlarged view of a read head according to Embodiment 1 at the surface opposing to a recording medium. A read head 100 has a lower magnetic shield layer 1 comprising NiFe or the like of 3 μm thickness disposed by way of base alumina on a substrate (not illustrated), a lower electrode layer 3 disposed on the lower magnetic shield layer 1, a TMR film 10 disposed above the lower electrode layer 3, a magnetic domain control film 41 disposed on both ends in the direction of the track width of the TMR film 10, an upper electrode layer 4 disposed above the TMR film 10 and above the magnetic domain control film 41, and an upper magnetic shield layer 2 comprising NiFe or the like of 2 μm thickness disposed on the upper electrode layer 4. In the constitution described above, the lower electrode layer 3 and the upper electrode layer 4 are electrically connected with the TMR film 10. An insulative layer 30 is disposed at the periphery of the TMR film 10, and between the magnetic domain control film 41 and the upper and lower electrode layers 3, 4. In the constitution described above, the lower magnetic shield 1 may be constituted also as the lower electrode layer 3, and the upper magnetic shield 2 may be constituted also as the upper electrode layer 4.

The TMR film 10 includes, from the side of the lower magnetic shield layer 1, an underlayer 12, an anti-ferromagnetic layer 13 comprising MnPt or the like of 15 nm thickness, a first ferromagnetic pinned layer 14 comprising NiFe or the like of 2 nm thickness, a non-magnetic separation layer 15 comprising Ru or the like of 1 nm thickness, a second ferromagnetic pinned layer 16 comprising NiFe or the like of 3 nm thickness, a barrier layer 17 comprising alumina or the like of 1 nm thickness, a free layer 1 (18) comprising NiFe or the like of 5 nm thickness, a non-magnetic intermediate layer 19 comprising Ru or the like of 0.8 nm thickness, a free layer 2 (20) comprising NiFe or the like of 2 nm thickness, and a cap layer 21. The first ferromagnetic pinned layer 14, the non-magnetic separation layer 15, and a second ferromagnetic pinned layer 16 constitute a pinned layer. In the example described above, the TMR film 10 is used as the magnetoresistive film, but a CPP-GMR film may also be used instead of the TMR film. Further, the anti-ferromagnetic layer 13 may be saved depending on the case.

Thin film constituting the TMR film or the CPP-GMR film was prepared as described below by an RF magnetron sputtering apparatus. It was prepared by successively stacking the following materials to a ceramic substrate of 1 mm thickness in an Ar gas atmosphere of 1 to 6 mm Torr. As a sputtering target, each of targets of Ta, Ni-20 at % Fe alloy, Cu, Co, MnPt, Ru, alumina, and NiMn was used. Chip of Fe and Ni each of 1 cm square were properly arranged on the Co target to adjust control the composition. Each of the layers of the stacked film was formed successively by generating plasmas in an apparatus while applying an RF power to cathodes disposed with each of the targets and by opening and closing shutters provided on every cathode one by one. During film formation, a magnetic field of about 640 A/m was applied in parallel with the substrate by using a permanent magnet to provide monoaxial anisotropy. A heat treatment at 270° C. for 3 hr was applied to the formed film under vacuum in the magnetic field to cause phase transformation to the MnPt anti-ferromagnetic layer 13, and then magnetic resistance at a room temperature was measured and evaluated.

The TMR film 10 was prepared by patterning such that the width in the direction of the track width of the barrier layer 17 had a desired value. It was set to 80 nm in this embodiment. In the patterning, a photoresist or the like formed to a predetermined width was disposed over the TMR film before patterning, and by using this as a mask, unnecessary portion was etched. Then, a hard magnetic film as a magnetic domain control film 41 comprising CoCrPt or the like of about 40 nm thickness was formed on both ends in the direction of the track width of the TMR film 10. The shape of the hard magnetic film was adjusted such that Sp2=5 nm and Sp1=10 nm.

The shape of the hard magnetic film was attained by adjusting the height of the resist mask and the incident direction of sputtered particles upon ion beam sputtering. Alternatively, after forming an insulative film and a hard magnetic film in the direction of the track width, it may be etched again into a desired shape by ion beam. After the heat treatment, a magnetizing treatment for the hard magnetic film was conducted at a room temperature to form a permanent magnet as the magnetic domain control film 41. A gap Gs between the upper magnetic shield layer 2 and the lower magnetic shield layer 1 at a portion where the TMR film 10 was disposed was about 36 nm.

In Embodiment 1 described above, while the free layer 1 and the free layer 2 each are a single layer comprising NiFe or the like, they may be a multi-layered film constituted with two or more of ferromagnetic layers by way of a non-magnetic metal layer, in which magnetizations of the ferromagnetic layers are in parallel with each other. Further, while Ru was used for the non-magnetic intermediate layer, it may be at least one element selected from the group consisting of Ta, Cu, Ru, Cr, Ir and Rh.

Figure 5:
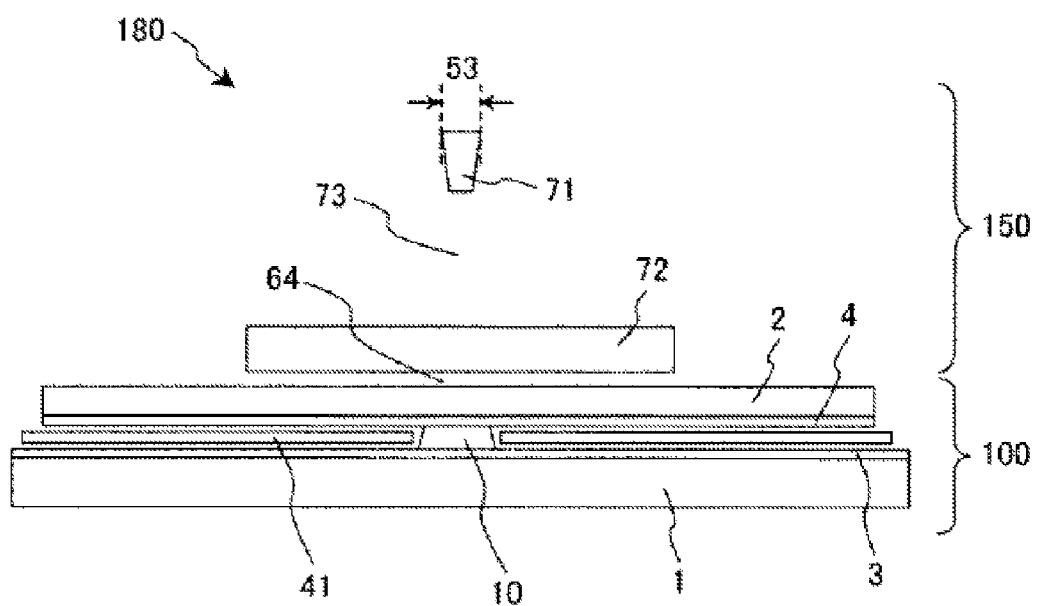
FIG. 5 is a view of a perpendicular recording magnetic head according to Embodiment 1 at the medium opposing surface.

FIG. 5 shows a constitution of a perpendicular recording magnetic head 180 comprising the read head 100 manufactured as described above and a perpendicular magnetic write head 150 in combination as viewed at the surface opposing to a medium. The perpendicular magnetic write head 150 has a sub pole 72 comprising an NiFe alloy or the like of about 2 μm thickness disposed by way of a non-magnetic separation layer 6 comprising alumina or the like of 500 nm thickness above the read head 100, and a main pole 71 comprising an FeCo alloy or the like of 200 nm thickness disposed by way of a magnetic gap 73 above the sub pole 72. A coil 80 is disposed between the main pole 71 and the sub pole 72 (refer to FIG. 6). The main pole 71 is formed as an inverted trapezoidal shape with a wide upper width and a narrow lower width, in which the upper width 53 is about 130 nm. A distance between the main pole 71 and the sub pole 72 (thickness for magnetic gap 73) in an air bearing surface (ABS) is about 5 μm.

Figure 6:
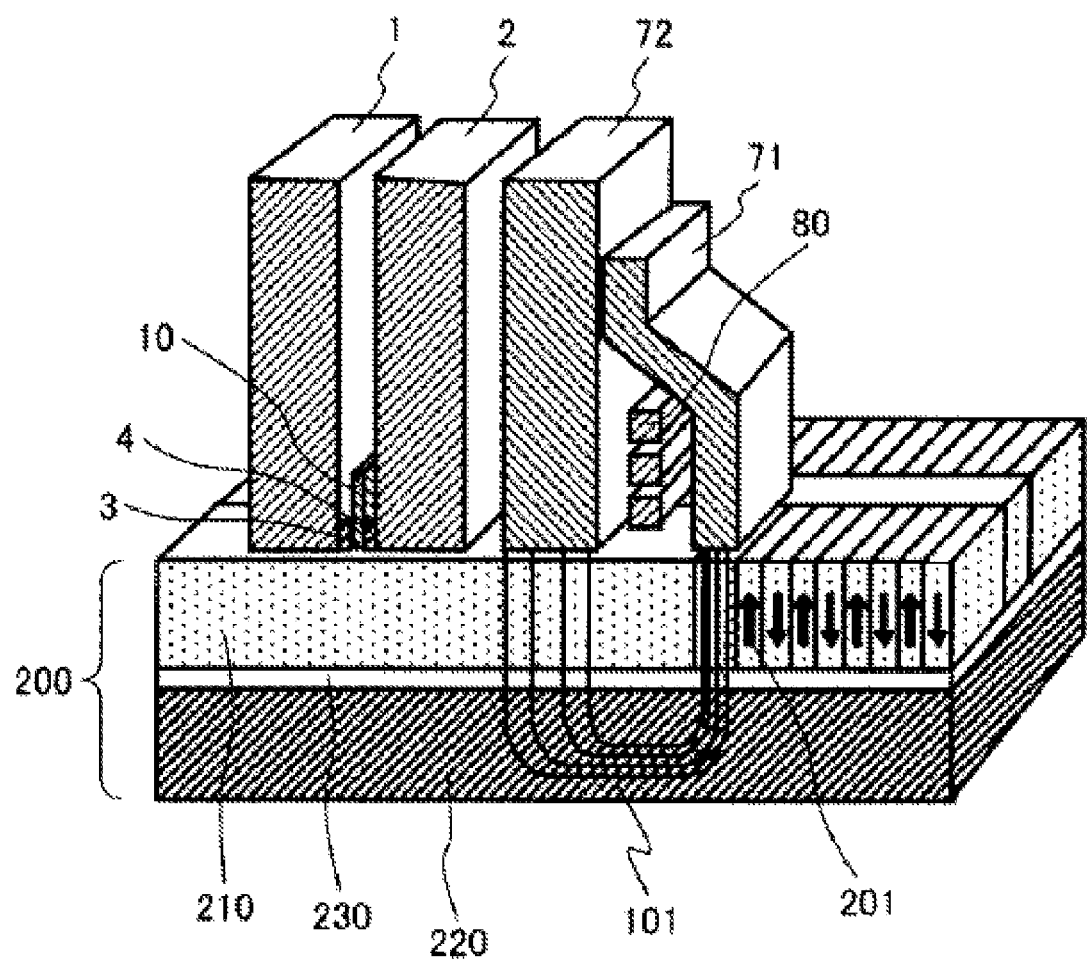
FIG. 6 is a view schematically showing the state of perpendicular magnetic recording of a perpendicular recording magnetic head according to Embodiment 1.

FIG. 6 schematically shows the state of perpendicular magnetic recording using the magnetic head 180 as described above. A recording magnetic field 101 is generated in a magnetic gap between the main pole 71 and the sub pole 72 by supplying a recording current in a desired pattern to the coil 80 between the main pole 71 and the sub pole 72, which is applied in a desired pattern to a perpendicular magnetic recording medium 200 thereby writing magnetization information 201 on a recording layer 210. For effective use of the magnetic field generated by the main pole 71, a non-magnetic separation film 230 of about 5 nm thickness is formed under the recording layer 210 and a soft magnetic underlayer 220 of about 200 nm thickness is formed therebelow. Further, information is read by detecting a magnetic field leaking from the magnetization information 201 written into the recording layer 210 by the TMR film 10.

The magnetic head 180 of Embodiment 1 was caused to fly such that a magnetic spacing relative to the perpendicular magnetic recording medium 200 was 12 nm, and read/write characteristics thereof were evaluated. For confirming the stability of the reading operation, read/write operation was conducted repetitively to measure the change of the read output. The fluctuation of the read output was satisfactory as 2.5% relative to repetitive read/write for 1,000,000 cycles. In this case, fluctuation of the read output was defined as a value obtained by dividing the difference between the maximum value and the minimum value of the read output by an average value. From the result, it has been found that stable reading operation was conducted. Then, when an SN ratio of the read head 100 was measured, it showed a high value of about 31 dB. Noises used in the calculation of the SN ratio of the read head are those obtained by subtracting medium noises from total noises. For comparison, a magnetic head of an existent structure was manufactured in an identical device size by using an identical magnetoresistive film, and read/write characteristics were evaluated. As a result, the read head SN ratio was about 28 dB which was a value lower by 3 dB compared with the magnetic head of the embodiment. As described above, according to this embodiment, a magnetic head of stable reading operation and showing high SN ratio can be obtained.

Figure 7:
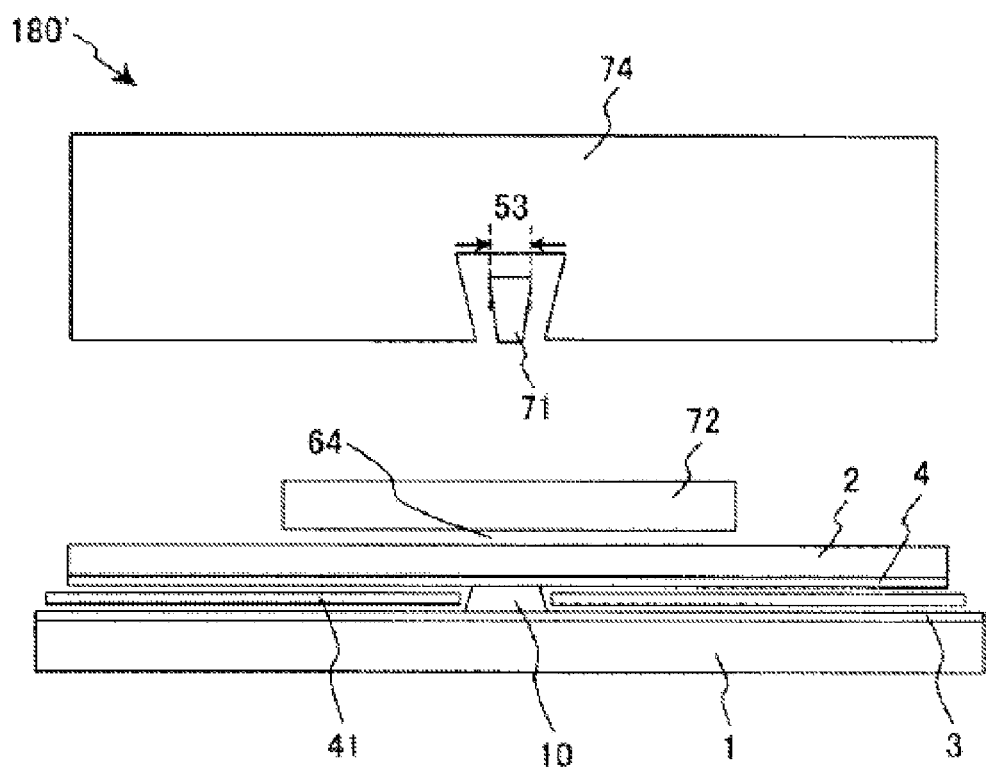
FIG. 7 is a view of a perpendicular recording magnetic head according to a modified example of Embodiment 1 as viewed at the medium opposing surface.

FIG. 7 shows a modified example of the magnetic head according to Embodiment 1. A magnetic head 180' is of a constitution having a wrap-around shield 74 around a main pole 71 and other constitutions are identical with those in Embodiment 1. The wrap-around shield 74 is a magnetic shield disposed on the trailing side and both sides of the main pole 71 integrally. By the provision of the wrap-around shield 74, the magnetic field gradient of the recording magnetic field from the main pole 71 can be made abrupt to suppress recording blurring in the direction of the track width. As a matter of fact, the function is identical with a case where a trailing shield and a side shield are formed separately. The wrap-around shield 74 is formed by forming a magnetic layer comprising NiFe or the like by way of a non-magnetic layer such as alumina above and on both sides of the main pole 71.

Embodiment 2

Figure 8:
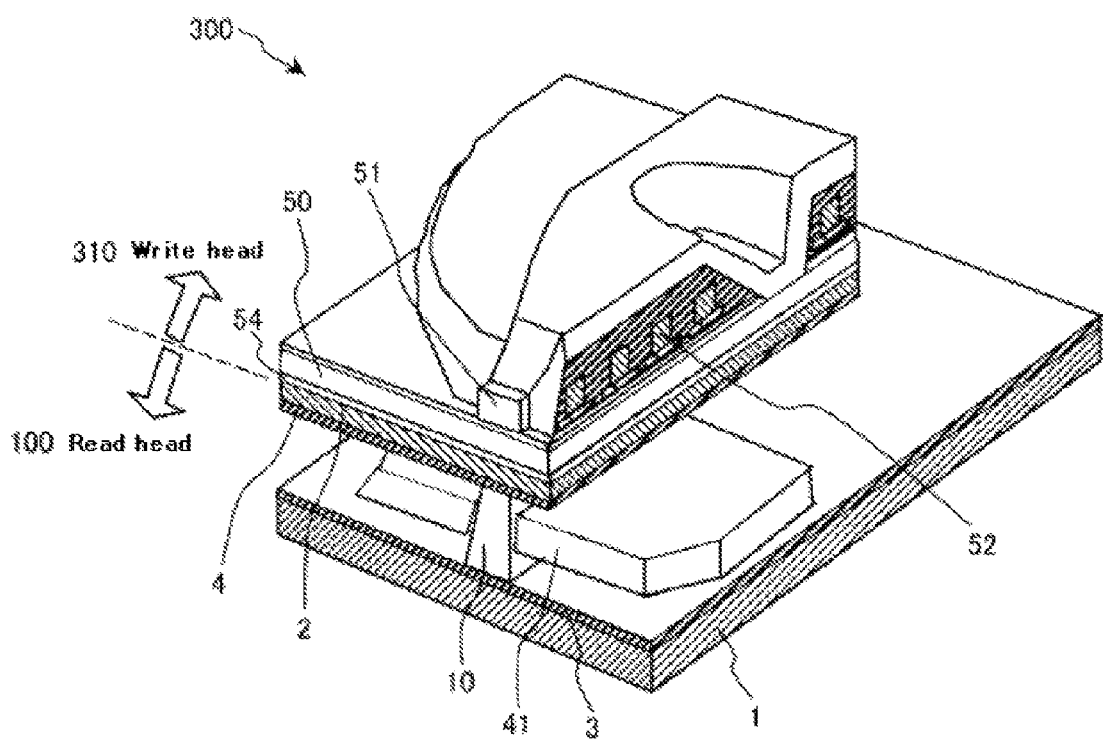
FIG. 8 is a schematic perspective view of a longitudinal recording magnetic head according to Embodiment 2.

FIG. 8 shows a schematic perspective cross sectional view of a magnetic head according to Embodiment 2. A magnetic head 300 is a magnetic head for longitudinal magnetic recording and comprises the read head 100 of Embodiment 1 and a longitudinal magnetic write head 310 in combination. The longitudinal magnetic write head 310 has a lower core 50 disposed above the read head 100 by way of a non-magnetic separation layer 54 comprising alumina or the like of 500 nm thickness, an upper core 51, and a coil 52 for generating a magnetic flux disposed between the cores. A recording magnetic field is generated in a recording gap between the upper and lower cores 51, 50 by supplying a writing current in a desired pattern to the coil 52, which is applied in a desired pattern to a magnetic medium to write a magnetization information having a desired magnetizing direction to the magnetic medium. Further, information is read by detecting the magnetic field leaking from the magnetization information written in the magnetic medium by a magnetoresistive film 10. Also in the magnetic head, reading operation is stable and high SN ratio is shown.

Figure 9:
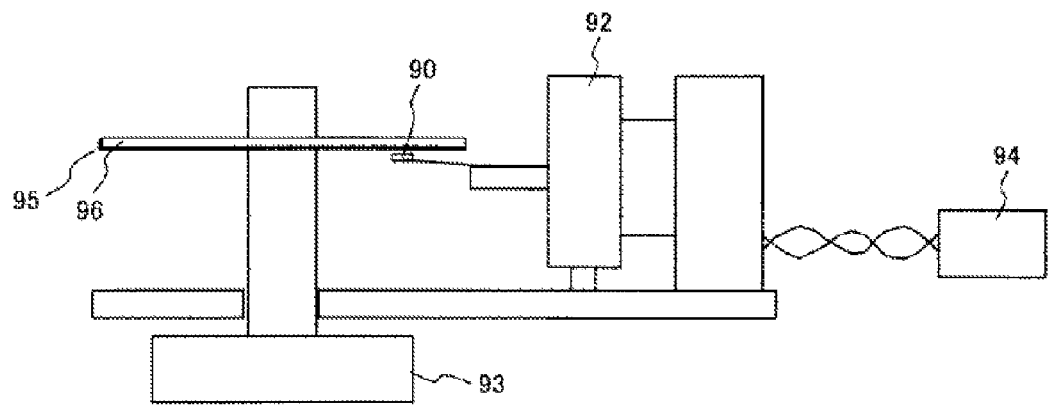
FIG. 9 is a schematic constitutional view of a magnetic disk apparatus having a magnetic head according to an embodiment mounted thereon.

FIG. 9 is an example for the constitution of a magnetic recording disk apparatus having, mounted thereon, a magnetic head according to Embodiment 1 or a modification example thereof, or Embodiment 2. A disk 95 holding a recording medium 96 for magnetically recording information is rotated by a spindle motor 93, and a head slider 90 is guided onto a track of the disk 95 by an actuator 92. That is, in the magnetic disk apparatus, a magnetic head according to Embodiment 1 or a modification example thereof, or Embodiment 2 formed above the head slider 90 conducts relative movement in proximity to a predetermined recording position on the disk 95 by the actuator 92 to successively write and read signals. The actuator 92 may be a rotary actuator. Recording signals are recorded by way of a signal processing system 94 on the medium by a write head, and the output of the read head is obtained as signals by way of the signal processing system 94. Further, upon moving the head slider 90 to a desired recording track, the head slider 90 can be positioned by detecting the position on the track by using a high sensitive output and controlling the actuator 92. In FIG. 9, while the head slider 90 and the disk 95 are shown each by one, they may also be disposed in plurality. Further, information may be recorded on the disk 95 having recording medium 96 on both sides thereof. In the case where information is recorded on both sides of the disk, the head slider 90 is disposed on both sides of the disk. The magnetic disk apparatus can attain high recording density by mounting the magnetic head according to each of the embodiments described above. Further, by mounting a perpendicular magnetic write head and a perpendicular magnetic recording disk according to Embodiment 1 or the modification example, a magnetic disk apparatus having an in-plane recording density of more than 300 Gbits per 1 square cm can be attained.

What is claimed is:

1. A magnetic head comprising:
   a lower magnetic shield layer;
   an upper magnetic shield layer;
   a magnetoresistive film disposed between the lower magnetic shield layer and the upper magnetic shield layer, the magnetoresistive film having a pinned layer, an intermediate layer, and a free layer; and
   a magnetic domain control film disposed on both ends in the direction of the track width of the magnetoresistive film;
   wherein the free layer has a first free layer and a second free layer stacked with a non-magnetic intermediate layer between, the first free layer being stacked on the intermediate layer over the pinned layer, magnetization in the first free layer and magnetization in the second free layer being in anti-parallel with each other, and a magnetization amount of the first free layer being larger than a magnetization amount of the second free layer, and
   wherein Sp2>Sp1 is satisfied when assuming a distance between the first free layer and the magnetic domain control film is Sp1, and a distance between the second free layer and the magnetic domain control film is Sp2.

2. The magnetic head according to claim 1, wherein the relation between Sp1 and Sp2 is Sp2>2×Sp1.

3. The magnetic head according to claim 1, wherein the Sp1 is a distance between the center of the first free layer in the direction of its thickness and the magnetic domain control film, and the Sp2 is a distance between the center of the second free layer in the direction of its thickness and the magnetic domain control film.

4. The magnetic head according to claim 1, comprising a lower electrode layer disposed above the lower magnetic shield layer, and an upper electrode layer disposed below the upper magnetic shield layer.

5. The magnetic head according to claim 1, wherein the free layer 1 and the second free layer each comprise two or more ferromagnetic layers by way of a non-magnetic metal layer, and magnetizations in each of the ferromagnetic layers are in parallel with each other.

6. The magnetic head according to claim 1, wherein the non-magnetic intermediate layer is at least one element selected from the group consisting of Ta, Cu, Ru, Cr, Ir, and Rh.

7. The magnetic head according to claim 1, comprising a write head disposed adjacent to the upper magnetic shield layer.

8. A magnetic head comprising:
   a lower magnetic shield layer;
   an upper magnetic shield layer;
   a magnetoresistive film disposed between the lower magnetic shield layer and the upper magnetic shield layer, the magnetoresistive film having a pinned layer, an intermediate layer and a free layer; and
   a magnetic domain control film disposed on both ends in the direction of the track width of the magnetoresistive film;
   wherein the free layer has a first free layer and a second free layer stacked with a non-magnetic intermediate layer between, the first free layer being stacked on the intermediate layer over the pinned layer, magnetization in the first free layer and magnetization of second free layer being in anti-parallel with each other, and a product of a saturation magnetic flux density of the first free layer and a thickness of the first free layer $(Bs \cdot t)_1$ being larger than a product of a saturation magnetic flux density of the second free layer and a thickness of the second free layer $(Bs \cdot t)_2$, and
   wherein $(Br \cdot t)_{PM} \geq (9 \times Sp1/ts) \times \{(Bs \cdot t)_1 - (Bs \cdot t)_2\}$ and $H_{AF2} > H_{bias2}$ are satisfied when a distance between the first free layer and the magnetic domain control film is Sp1, a distance between the second free layer and the magnetic domain control film is Sp2, a distance between the first free layer and the upper magnetic shield is ts, a product of the residual magnetic flux density of the magnetic domain control film and a thickness of the magnetic domain control film as $(Br \cdot t)_{PM}$, an anti-ferromagnetic coupling field to be applied to the second free layer is $H_{AF2}$, and the magnetic domain control field to be applied to the second free layer as $H_{bias2}$.

9. The magnetic head according to claim 8, wherein the relation between the Sp1 and the Sp2 is Sp2>Sp1 for satisfying $H_{AF2} > H_{bias2}$.

10. The magnetic head according to claim 9, wherein the relation between the Sp1 and the Sp2 is Sp2>2×Sp1.

11. The magnetic head according to claim 8, wherein the Sp1 is a distance between the center of the first free layer in the direction of its thickness and the magnetic domain control film, and the Sp2 is a distance between the center of the second free layer in the direction of its thickness and the magnetic domain control film.

12. The magnetic head according to claim 8, comprising a lower electrode layer disposed above the lower magnetic shield layer, and an upper electrode layer disposed below the upper magnetic shield layer.

13. The magnetic head according to claim 8, comprising a write head adjacent to the upper magnetic shield layer.

14. A method of manufacturing a magnetic head comprising the steps of:
   forming a lower magnetic shield layer;
   stacking a pinned layer, an intermediate layer, a first free layer, a non-magnetic intermediate layer, and a second free layer above the lower magnetic shield layer thereby forming a magnetoresistive film, in which magnetization in the first free layer and magnetization in the second free layer are in anti-parallel with each other, and the magnetization amount in the first free layer is larger than the magnetization amount in the second free layer;
   forming a magnetic domain control film on both ends in the direction of the track width of the magnetoresistive film, in which Sp2>Sp1 is satisfied when assuming a distance between the center of the first free layer in the direction of its thickness and the magnetic domain control film is Sp1 and a distance between the center of the second free layer in the direction of its thickness and the magnetic domain control film is Sp2; and forming an upper magnetic shield layer above the magnetoresistive film and the magnetic domain control film.

15. The manufacturing method of a magnetic head according to claim 14, wherein the step of forming the magnetic domain control film includes a step of controlling the incident direction of sputtered magnetic particles so as to satisfy Sp2>Sp1.

16. The manufacturing method of a magnetic head according to claim 14, wherein the step of forming the magnetic domain control film includes a step of forming a hard magnetic film and a step of patterning the hard magnetic film by ion milling so as to satisfy Sp2>Sp1.

* * * * *